United States Patent
Lv

(10) Patent No.: US 9,860,083 B2
(45) Date of Patent: Jan. 2, 2018

(54) CHANNEL ESTIMATION METHOD, APPARATUS, AND DEVICE AND MULTICHANNEL MICROWAVE COMMUNICATIONS SYSTEM

(71) Applicant: HUAWEI TECHNOLOGIES CO., LTD., Shenzhen (CN)

(72) Inventor: Rui Lv, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/142,472

(22) Filed: Apr. 29, 2016

(65) Prior Publication Data
US 2016/0248604 A1  Aug. 25, 2016

Related U.S. Application Data

(63) Continuation of application No. PCT/CN2013/086428, filed on Nov. 1, 2013.

(51) Int. Cl.
H04L 25/02 (2006.01)
H04B 7/06 (2006.01)
H04B 7/0413 (2017.01)

(52) U.S. Cl.
CPC ....... *H04L 25/0204* (2013.01); *H04B 7/0413* (2013.01); *H04B 7/0617* (2013.01);
(Continued)

(58) Field of Classification Search
CPC . H04L 25/024; H04L 25/0202; H04B 7/0626; H04B 7/0617; H04B 7/0413
See application file for complete search history.

(56) References Cited

U.S. PATENT DOCUMENTS

| 5,825,787 A | * | 10/1998 | Statovici | .......... | G01R 31/31921 714/738 |
| 2005/0088959 A1 | * | 4/2005 | Kadous | ................. | H04L 1/0003 370/208 |

(Continued)

FOREIGN PATENT DOCUMENTS

| CN | 101615937 A | 12/2009 |
| CN | 103199909 A | 7/2013 |

OTHER PUBLICATIONS

Tamara G.Kolda and Brett W.Bader, "Tensor Decompositions and Applications", SIAM Review, Jun. 2008.*

(Continued)

*Primary Examiner* — Aristocratis Fotakis
(74) *Attorney, Agent, or Firm* — Staas & Halsey LLP

(57) ABSTRACT

The present invention discloses a channel estimation method, apparatus, and device and a multichannel microwave communications system. According to the channel estimation method, a first vector group corresponding to a transmit end and a second vector group corresponding to a receive end are first obtained according to a transmit-receive array size; then a subchannel estimation procedure is performed multiple times according to the transmit-receive array size, the first vector group, and the second vector group, to obtain multiple corresponding subchannel estimated coefficients; and finally, a real channel matrix is determined according to the first vector group, the second vector group, and an estimation matrix consisting of the multiple subchannel estimated coefficients.

15 Claims, 7 Drawing Sheets

(52) U.S. Cl.
CPC ........ *H04L 25/024* (2013.01); *H04L 25/0224* (2013.01); *H04L 25/0244* (2013.01)

(56) References Cited

U.S. PATENT DOCUMENTS

| | | | | |
|---|---|---|---|---|
| 2008/0080545 | A1* | 4/2008 | Wong | H04L 27/2608 370/437 |
| 2008/0130803 | A1* | 6/2008 | Chang | H04L 25/0204 375/346 |
| 2009/0058724 | A1* | 3/2009 | Xia | H01Q 3/2605 342/368 |
| 2009/0290616 | A1* | 11/2009 | Sridhara | H04B 7/0615 375/146 |
| 2010/0091675 | A1 | 4/2010 | Sawai | |
| 2010/0172430 | A1* | 7/2010 | Melzer | H04B 7/0417 375/267 |
| 2010/0178884 | A1 | 7/2010 | Nassiri-Toussi et al. | |
| 2010/0331007 | A1* | 12/2010 | Wang | H04W 16/10 455/452.2 |
| 2011/0085610 | A1* | 4/2011 | Zhuang | H04L 5/0037 375/260 |
| 2012/0063336 | A1* | 3/2012 | Shany | H04B 7/0452 370/252 |
| 2012/0120839 | A1* | 5/2012 | Liu | H04L 1/0026 370/252 |
| 2012/0230380 | A1* | 9/2012 | Keusgen | H04B 7/0482 375/227 |

OTHER PUBLICATIONS

International Search Report dated Aug. 4, 2014 in corresponding International Patent Application No. PCT/CN2013/086428.
Extended European Search Report dated Oct. 10, 2016 in corresponding European Patent Application No. 13896251.9.
International Search Report dated Aug. 4, 2014, in corresponding International Application No. PCT/CN2013/086428.

* cited by examiner

CHANNEL ESTIMATION METHOD, APPARATUS, AND DEVICE AND MULTICHANNEL MICROWAVE COMMUNICATIONS SYSTEM

CROSS-REFERENCE TO RELATED APPLICATIONS

This application is a continuation of International Application No. PCT/CN2013/086428, filed on Nov. 1, 2013, which is hereby incorporated by reference in its entirety.

TECHNICAL FIELD

The present invention relates to the field of communications technologies, and in particular, to a channel estimation method, apparatus, and device and a multichannel microwave communications system.

BACKGROUND

When a multichannel microwave communications system is used to enhance a signal-to-noise ratio of a communications link and reduce interference between different links, phase shifters on channels need to be adjusted depending on channel information between the links, so as to form an expected beam shape on an antenna array.

In the prior art, a multichannel microwave system usually uses an analog multichannel structure. When estimating channel information (or a channel matrix), such an analog multichannel system that uses the analog multichannel structure needs to estimate parameters of subchannels in the system at different times. A specific implementation method thereof is that: a radio frequency switch or a variable gain amplifier is added on each subchannel; then subchannels are controlled to be switched on/switched off by using the switches or by means of gain adjustment on the subchannels; subchannels between pairs of antennas of a transmitter and a receiver are traversed sequentially, and parameters corresponding to the subchannels are obtained separately; and finally, complete channel information is obtained by means of combination.

However, in the foregoing channel estimation method, using of a radio frequency switch increases an insertion loss of a channel and degrades link performance; and a variable gain amplifier increases nonlinearity of the channel, and a gain suppression capability of the variable gain amplifier is limited. This leads to energy leakage, thereby affecting precision of a channel estimation result. In addition, adding the radio frequency switch or the variable gain amplifier on the channel also increases a cost and a volume of the system.

SUMMARY

In view of this, the present invention provides a channel estimation method, apparatus, and device and a multichannel microwave communications system, to overcome a problem in the prior art that channel link performance degrades or precision of a channel estimation result is low because a radio frequency switch or a variable gain amplifier needs to be added on each subchannel.

To achieve the foregoing objective, the present invention provides the following technical solutions:

According to a first aspect, a channel estimation method is provided, including:

obtaining, according to a transmit-receive array size N×M determined by a quantity N of array elements at a transmit end and a quantity M of array elements at a receive end, a first vector group corresponding to the transmit end and a second vector group corresponding to the receive end, where N and M are positive integers;

separately performing a subchannel estimation procedure N×M or more times, to obtain N×M or more subchannel estimated coefficients, where the subchannel estimation procedure includes: selecting a first vector from the first vector group, selecting a second vector from the second vector group, and performing subchannel estimated coefficient detection on a subchannel determined by the first vector and the second vector, to obtain a subchannel estimated coefficient; and determining a real channel matrix according to the first vector group, the second vector group, and an estimation matrix consisting of the N×M or more subchannel estimated coefficients.

In a first possible implementation manner of the first aspect, the obtaining, according to a transmit-receive array size, a first vector group corresponding to the transmit end and a second vector group corresponding to the receive end includes:

generating an (N×M)×(N×M) matrix as a generator matrix according to the quantity N of the array elements at the transmit end and the quantity M of the array elements at the receive end, where the generator matrix is a full-rank matrix, and each column of the generator matrix can constitute an N×M matrix whose rank is 1;

performing tensor product decomposition on each column of the generator matrix according to the array size, to obtain the first vector group consisting of N×M vectors whose lengths are N and the second vector group consisting of N×M vectors whose lengths are M; and establishing a correspondence between the first vector group and a transmit end array having N array elements, and establishing a correspondence between the second vector group and a receive end array having M array elements.

In the first possible implementation manner of the first aspect, after the obtaining a first vector group and a second vector group, the method further includes:

merging same vectors in the first vector group, and merging same vectors in the second vector group.

In the first possible implementation manner of the first aspect, when N and M are even numbers, the generator matrix is a Hadamard matrix, and the determining a real channel matrix according to the first vector group, the second vector group, and an estimation matrix consisting of the N×M or more subchannel estimated coefficients includes:

combining the N×M or more subchannel estimated coefficients, to form the estimation matrix;

determining vectorized data of the estimation matrix; and determining the real channel matrix according to a product of a transpose matrix of the generator matrix and the vectorized data of the estimation matrix.

In the first possible implementation manner of the first aspect, the determining a real channel matrix according to the first vector group, the second vector group, and an estimation matrix consisting of the N×M or more subchannel estimated coefficients includes:

combining the N×M or more subchannel estimated coefficients, to form the estimation matrix;

determining vectorized data of the estimation matrix; and determining the real channel matrix according to a product of an inverse matrix of the generator matrix and the vectorized data of the estimation matrix.

In a second possible implementation manner of the first aspect, the selecting a first vector from the first vector group, selecting a second vector from the second vector group, and performing subchannel estimated coefficient detection on a subchannel determined by the first vector and the second vector, to obtain a subchannel estimated coefficient includes:

selecting a transmit end vector from the first vector group corresponding to the transmit end, and configuring a phase shifter parameter of the transmit end; and selecting a receive end vector from the second vector group corresponding to the receive end, and configuring a phase shifter parameter of the receive end; and controlling the transmit end to transfer a known training sequence signal to the receive end, and determining a subchannel estimated coefficient in current configuration according to signal quality of the known training sequence signal received by the receive end.

In a third possible implementation manner of the first aspect, the separately performing a subchannel estimation procedure N×M or more times, to obtain N×M or more subchannel estimated coefficients includes:

sequentially pairing each vector in the first vector group corresponding to the transmit end with each vector in the second vector group corresponding to the receive end, configuring phase shifter parameters by using results of the paring separately, and transmitting the known signal, to obtain multiple subchannel estimated coefficients that each correspond to each vector pairing case.

In a fourth possible implementation manner of the first aspect, the receive end includes a communicating receive end and an interference receive end, and before the separately performing a subchannel estimation procedure N×M or more times, the method further includes:

controlling the transmit end to synchronize with the communicating receive end, and controlling the transmit end to synchronize with the interference receive end.

In the fourth possible implementation manner of the first aspect, a quantity of array elements at the communicating receive end is X, and a quantity of array elements at the interference receive end is Y; and when the quantity Y of the array elements at the interference receive end is less than the quantity X of the array elements at the communicating receive end, the separately performing a subchannel estimation procedure N×M or more times includes:

separately performing the subchannel estimation procedure N×X or more times for a communications channel, to obtain N×X or more subchannel estimated coefficients; separately performing the subchannel estimation procedure N×Y or more times for an interference channel, to obtain N×Y or more subchannel estimated coefficients; and after the subchannel estimation procedure has been performed for all subchannels of the interference channel, no longer performing the subchannel estimation procedure for the interference channel, and continuing to perform the subchannel estimation procedure for a not-yet-estimated subchannel of the communications channel.

In the fourth possible implementation manner of the first aspect, when a quantity Y of array elements at the interference channel receive end is greater than a quantity X of array elements at the communicating receive end, the separately performing a subchannel estimation procedure N×M or more times includes:

separately performing the subchannel estimation procedure N×X or more times for a communications channel, to obtain N×X or more subchannel estimated coefficients; separately performing the subchannel estimation procedure N×Y or more times for an interference channel, to obtain N×Y or more subchannel estimated coefficients; and after the subchannel estimation procedure has been performed for all subchannels of the communications channel, no longer performing the subchannel estimation procedure for the communications channel, and continuing to perform the subchannel estimation procedure for a not-yet-estimated subchannel of the interference channel.

In the fourth possible implementation manner of the first aspect, before the continuing to perform the subchannel estimation procedure for a not-yet-estimated subchannel of the interference channel, the method further includes:

controlling the interference receive end to send a remaining-subchannel estimation request to the transmit end.

According to a second aspect, this application provides a channel estimation apparatus, including:

a vector group acquiring module, configured to obtain, according to a transmit-receive array size N×M determined by a quantity N of array elements at a transmit end and a quantity M of array elements at a receive end, a first vector group corresponding to the transmit end and a second vector group corresponding to the receive end, where N and M are positive integers;

an estimated-coefficient acquiring module, configured to separately perform a subchannel estimation procedure N×M or more times, to obtain N×M or more subchannel estimated coefficients, where the subchannel estimation procedure includes: selecting a first vector from the first vector group, selecting a second vector from the second vector group, and performing subchannel estimated coefficient detection on a subchannel determined by the first vector and the second vector, to obtain a subchannel estimated coefficient; and a channel matrix determining module, configured to determine a real channel matrix according to the first vector group, the second vector group, and an estimation matrix consisting of the N×M or more subchannel estimated coefficients.

In a first possible implementation manner of the second aspect, the vector group acquiring module includes:

an estimation matrix determining module, configured to generate an (N×M)×(N×M) matrix as a generator matrix according to the quantity N of the array elements at the transmit end and the quantity M of the array elements at the receive end, where the generator matrix is a full-rank matrix, and each column of the generator matrix can constitute an N×M matrix whose rank is 1;

a vector group determining module, configured to perform tensor product decomposition on each column of the generator matrix according to the array size, to obtain the first vector group consisting of N×M vectors whose lengths are N and the second vector group consisting of N×M vectors whose lengths are M; and a vector group correspondence module, configured to establish a correspondence between the first vector group and a transmit end array having N array elements, and establish a correspondence between the second vector group and a receive end array having M array elements.

In the first possible implementation manner of the second aspect, the vector group acquiring module further includes:

a vector merging module, configured to: after the vector group determining module obtains the first vector group and the second vector group, merge same vectors in the first vector group, and merge same vectors in the second vector group.

In the first possible implementation manner of the second aspect, when N and M are even numbers, the generator matrix is a Hadamard matrix, and the channel matrix determining module includes:

an estimation matrix forming module, configured to combine the N×M or more subchannel estimated coefficients, to form the estimation matrix;

a vectorized data determining module, configured to determine vectorized data of the estimation matrix; and a first matrix determining module, configured to determine the real channel matrix according to a product of a transpose matrix of the generator matrix and the vectorized data of the estimation matrix.

In a second possible implementation manner of the second aspect, the channel matrix determining module includes:

an estimation matrix forming module, configured to combine the N×M or more subchannel estimated coefficients, to form the estimation matrix;

a vectorized data determining module, configured to determine vectorized data of the estimation matrix; and a second matrix determining module, configured to determine the real channel matrix according to a product of an inverse matrix of the generator matrix and the vectorized data of the estimation matrix.

In a third possible implementation manner of the second aspect, the estimated-coefficient acquiring module includes a subchannel estimation module, and the subchannel estimation module is configured to perform a subchannel estimation procedure, where the subchannel estimation procedure includes:

selecting a transmit end vector from the first vector group corresponding to the transmit end, and configuring a phase shifter parameter of the transmit end; and selecting a receive end vector from the second vector group corresponding to the receive end, and configuring a phase shifter parameter of the receive end; and controlling the transmit end to transfer a known training sequence signal to the receive end, and determining a subchannel estimated coefficient in current configuration according to signal quality of the known training sequence signal received by the receive end.

In a fourth possible implementation manner of the second aspect, the receive end includes a communicating receive end and an interference receive end, and the channel estimation apparatus further includes:

a synchronization control module, configured to: before the estimated-coefficient acquiring module separately performs the subchannel estimation procedure N×M or more times, control the transmit end to synchronize with the communicating receive end, and control the transmit end to synchronize with the interference receive end.

According to a third aspect, a multichannel microwave communications system is provided, including any channel estimation apparatus described above.

According to a fourth aspect, a channel estimation device is further provided, including: a processor, a communications bus, and a memory, where the processor and the memory communicate with each other by using the communications bus;

the memory is configured to store a group of program instructions; and the processor is configured to invoke the program instructions stored in the memory, to execute the following operations:

obtaining, according to a transmit-receive array size N×M determined by a quantity N of array elements at a transmit end and a quantity M of array elements at a receive end, a first vector group corresponding to the transmit end and a second vector group corresponding to the receive end, where N and M are positive integers;

separately performing a subchannel estimation procedure N×M or more times, to obtain N×M or more subchannel estimated coefficients, where the subchannel estimation procedure includes: selecting a first vector from the first vector group, selecting a second vector from the second vector group, and performing subchannel estimated coefficient detection on a subchannel determined by the first vector and the second vector, to obtain a subchannel estimated coefficient; and determining a real channel matrix according to the first vector group, the second vector group, and an estimation matrix consisting of the N×M or more subchannel estimated coefficients.

As can be known from the foregoing technical solutions, compared with the prior art, the embodiments of the present invention disclose a channel estimation method and apparatus and a multichannel microwave communications system. According to the channel estimation method, training vector groups that correspond to a transmit end and a receive end respectively are first obtained according to a transmit-receive array size; then a subchannel estimation procedure is performed multiple times according to the transmit-receive array size and the training vector groups, to obtain multiple corresponding subchannel estimated coefficients; and finally, a real channel matrix is determined according to the training vector groups and an estimation matrix consisting of the multiple subchannel estimated coefficients. According to the method, apparatus, and system, by using a vector synthesis method, on/off and gain control of subchannels on a communications channel can be ignored, and estimation for the subchannels can be implemented without depending on on/off of the subchannels, so that in a corresponding communications system, an accurate channel matrix can be obtained by means of estimation without adding any extra circuit device, thereby avoiding a problem that channel link performance degrades or precision of a channel estimation result is low because a radio frequency switch or a variable gain amplifier is added in the communications system, lowering a system cost, and reducing a system volume.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely the embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
FIG. 1 is a structural diagram of a layout of a transmit end and a receive end on a communications channel.
Figure 2:
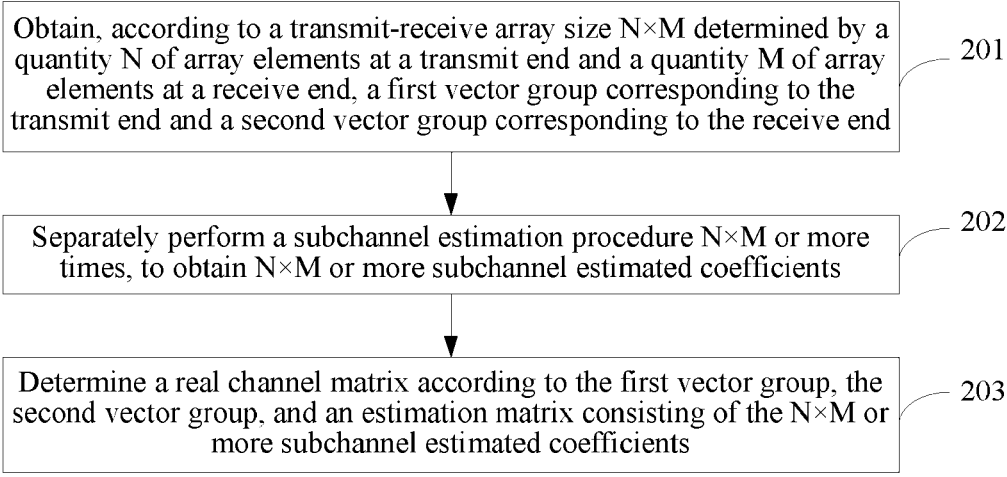
FIG. 2 is a flowchart of a channel estimation method according to an embodiment of the present invention.

FIG. 1 is a structural diagram of a layout of a transmit end and a receive end on a communications channel, and FIG. 2 is a flowchart of a channel estimation method according to an embodiment of the present invention. The method may be executed by a controller independent of the transmit end and the receive end. Certainly, the controller may be disposed at the transmit end, or may be disposed at the receive end, or may be disposed independently. Referring to FIG. 1 and FIG. 2, the channel estimation method may include the following steps:

Step 201: Obtain, according to a transmit-receive array size N×M determined by a quantity N of array elements at the transmit end and a quantity M of array elements at the receive end, a first vector group corresponding to the transmit end and a second vector group corresponding to the receive end.

N and M are positive integers. A vector in the first vector group is used to configure a phase shifter parameter of the transmit end, and a vector in the second vector group is used to configure a phase shifter parameter of the receive end.

Figure 3:
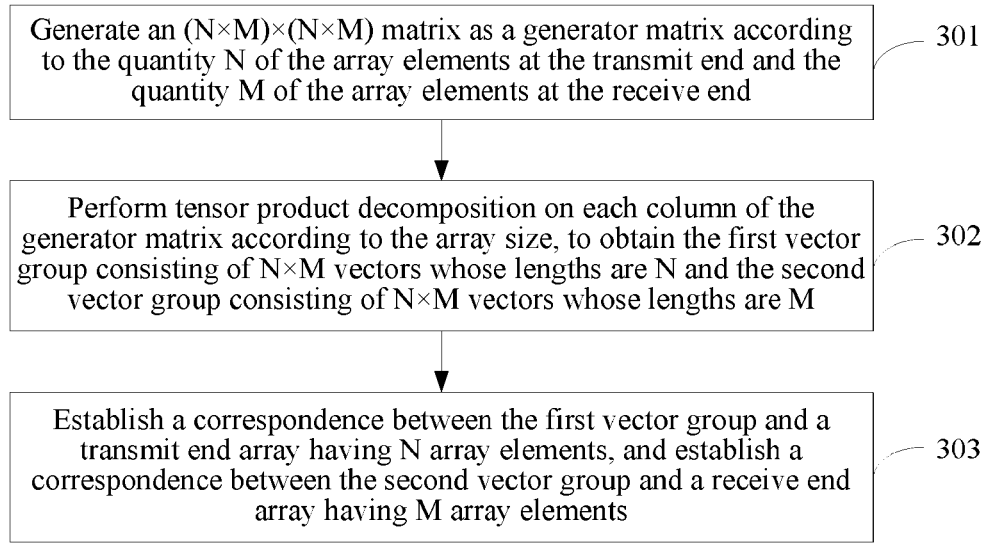
FIG. 3 is a flowchart of obtaining a first vector group and a second vector group according to an embodiment of the present invention.

In an exemplary example, for a specific process of step 201, reference may be made to FIG. 3. FIG. 3 is a flowchart of obtaining a first vector group and a second vector group according to an embodiment of the present invention. As shown in FIG. 3, the method may include the following steps:

Step 301: Generate an (N×M)×(N×M) matrix as a generator matrix according to the quantity N of the array elements at the transmit end and the quantity M of the array elements at the receive end, where the generator matrix is a full-rank matrix, and each column of the generator matrix can constitute an N×M matrix whose rank is 1.

In a case in which both N and M are even numbers, the generated (N×M)×(N×M) generator matrix may be a Hadamard matrix. As can be known from an attribute of a Hadamard matrix, in the case in which both N and M are even numbers, using of the Hadamard matrix can effectively simplify an operation in a channel estimation processing process and can simplify a channel estimation procedure on a system level.

Step 302: Perform tensor product decomposition on each column of the generator matrix according to the array size, to obtain the first vector group consisting of N×M vectors whose lengths are N and the second vector group consisting of N×M vectors whose lengths are M.

Because the generator matrix has N×M columns, after step 302, tensor product decomposition needs to be performed N×M times in total. Each time tensor product decomposition is performed, one vector $w_t$ whose length is N and one vector $w_r$ whose length is M are obtained. Therefore, N×M vectors $w_t$ whose lengths are N and N×M vectors $w_r$ whose lengths are M are finally obtained. It should be noted that vectors $w_t$ obtained in different tensor product decomposition processes may be the same or may be different, and vectors $w_r$ obtained in each tensor product decomposition may also be different.

In a case in which the generator matrix is a Hadamard matrix, both the vectors $w_t$ whose lengths are N and the vectors $w_r$ whose lengths are M are vectors having equal amplitudes, that is, there is no difference in gains or on/off between vector elements.

Step 303: Establish a correspondence between the first vector group and a transmit end array having N array elements, and establish a correspondence between the second vector group and a receive end array having M array elements.

After step 302, two groups that respectively consist of vectors whose lengths are N and vectors whose lengths are M are obtained. Then the group of vectors whose lengths are N may be bound to the transmit end having N array elements, and the group of vectors whose lengths are M may be bound to the receive end having M array elements, so that when a subchannel estimation procedure is performed subsequently, the transmit end and the receive end can conveniently select vectors from respective corresponding vector groups and further enable the selected vectors to participate in work of phase shifter configuration.

In another specific example of step 201, after the first vector group and the second vector group are obtained in step 302, a step of merging same vectors in the first vector group, and merging same vectors in the second vector group may be further included. In this way, an amount of subsequent work of selecting vectors from the vector groups and configuring phase shifters can be reduced effectively. In a case in which vector merging is not performed in the first vector group and the second vector group, the first vector group includes N×M vectors, the second vector group also includes N×M vectors, and to estimate a channel between the transmit end and the receive end, channel estimation needs to performed for each subchannel formed between the transmit end and the receive end; therefore, if a vector is selected from the first vector group and a vector is selected from the second vector group for pairing, so as to configure phase shifters of the transmit end and the receive end and determine subchannels between the transmit end and the receive end, vector pairing needs to be performed (N×M)×(N×M) times, that is, subchannel estimation needs to be performed (N×M)×(N×M) times. However, if the same vectors in the first vector group are merged and the same vectors in the second vector group are merged after the first vector group and the second vector group are obtained, a quantity of vector elements in the first vector group and a quantity of vector elements in the second vector group are reduced; therefore, a quantity of times that vector pairing needs to be performed is reduced, that is, a quantity of times of subchannel estimation is reduced, so that an amount of work of channel estimation is reduced.

It should be noted that even if the same vectors are merged in the first vector group and the same vectors are merged in the second vector group, a final quantity of times that subchannel estimation needs to be performed is not less than N×M, because the transmit end includes N array elements, the receive end includes M array elements, and N×M subchannels can be formed between the transmit end and the receive end.

Go back to FIG. 2, and proceed to step 202.

Step 202: Separately perform a subchannel estimation procedure N×M or more times, to obtain N×M or more subchannel estimated coefficients.

The subchannel may be considered as a single channel, and in the prior art, there are multiple methods that can implement acquiring of an estimated coefficient for a single channel.

In this step, subchannel estimation needs to be performed multiple times, and only one subchannel is estimated each time. For example, the transmit-receive array size is specifically: the transmit end includes N array elements, and the receive end includes M array elements, and therefore, the transmit-receive array size is N×M. Because different array elements of the transmit end and the receive end can be paired and combined, for a channel whose array size is N×M, to finally determine a parameter of the channel between the transmit end and the receive end, a subchannel estimation procedure needs to be performed at least N×M times to finally obtain N×M subchannel estimated coefficients.

The subchannel estimation procedure may be: selecting a first vector from the first vector group, selecting a second vector from the second vector group, and performing subchannel estimated coefficient detection on a subchannel determined by the first vector and the second vector, to obtain a subchannel estimated coefficient.

Figure 4:
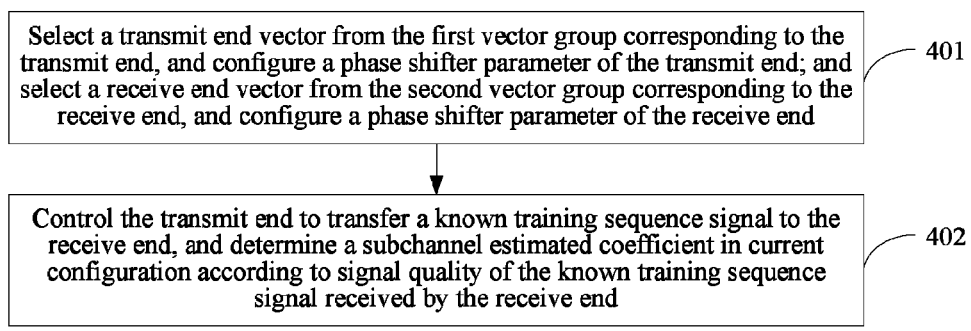
FIG. 4 is a schematic diagram of a subchannel estimation procedure according to an embodiment of the present invention.

For an exemplary procedure of the subchannel estimation procedure, reference may be made to FIG. 4. FIG. 4 is a schematic diagram of a subchannel estimation procedure according to an embodiment of the present invention. As shown in FIG. 4, the procedure may include the following steps:

Step 401: Select a transmit end vector from the first vector group corresponding to the transmit end, and configure a phase shifter parameter of the transmit end; and select a receive end vector from the second vector group corresponding to the receive end, and configure a phase shifter parameter of the receive end.

As introduced above, for a channel whose array size is N×M, subchannel estimation needs to be performed N×M times. Therefore, during the N×M times of subchannel estimation, phase shifter parameters for different phase-shift angles may be configured by using any combination of different vectors of the transmit end and the receive end.

Step 402: Control the transmit end to transfer a known training sequence signal to the receive end, and determine a subchannel estimated coefficient in current configuration according to signal quality of the known training sequence signal received by the receive end.

Because a signal transferred from the transmit end to the receive end is a known training sequence signal, after the receive end receives the known training sequence signal, an estimated coefficient of a subchannel determined by current phase shifter configuration may be estimated according to signal quality of the received signal.

Generally, a training sequence signal used for channel estimation is a special signal C consisting of several complex number symbols. The special signal C has two features: one is that a result of a related operation performed on C and a conjugate signal of C is a constant a, where the constant a is a real number; and the other is that a result of the foregoing related operation performed on a signal D and a conjugate signal of the special signal C that is before the shift is 0, where the signal D is obtained after any cyclic shift is performed on the special signal C. In this embodiment, during channel estimation, a signal R received by the receive end may be considered as a convolution of the signal C sent by the transmit end and a channel coefficient h. Channel estimation is performing a related operation on the received signal R and the conjugate signal of the sent signal C by using the foregoing two features of the training sequence signal, where the related operation includes that: each symbol of R is multiplied by each symbol of the conjugate signal of C, and products are added together, where an obtained result is a*h; and then a*h is divided by the constant a, where a complex number value that is finally obtained is the channel coefficient h, that is, a channel estimated coefficient in this embodiment.

When phase shift configuration is performed for the transmit end and the receive end, vectors in a training vector group may be used in a predetermined sequence, and a basic principle is that it is ensured that during all the N×M times of subchannel estimation, a combination of different vectors of the transmit end and the receive end appears and appears only once. In this way, step 202 may be specifically: sequentially pairing each vector in the first vector group corresponding to the transmit end with each vector in the second vector group corresponding to the receive end, configuring phase shifter parameters by using results of the paring separately, and transmitting the known signal, to obtain multiple subchannel estimated coefficients that each correspond to each vector pairing case.

Specifically, in this embodiment, the following selection sequences may be defined:

(1) In a subchannel estimation process, for all transmit ends, vectors in a training vector group are selected in a block-wise repeating manner to configure a phase shifter. If a transmit end is bound to a vector group $T=[wt_1, wt_2, \ldots, wt_N]$ consisting of N vectors, during channel estimation between the transmit end and a receive end having M array elements, a vector selection sequence for the transmit end is:

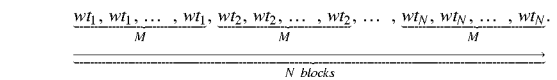

(2) In a subchannel estimation process, for all receive ends, vectors in a training vector group are selected in a cyclic repeating manner to configure a phase shifter. If a receive end is bound to a vector group $R=[wr_1, wr_2, \ldots, wr_M]$ consisting of M vectors, during channel estimation between the receive end and a transmit end having N array elements, a vector selection sequence for the receive end is:

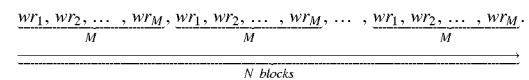

Go back to FIG. 2, and proceed to step 203.

Step 203: Determine a real channel matrix according to the first vector group, the second vector group, and an estimation matrix consisting of the N×M or more subchannel estimated coefficients.

By using vectorized data of the estimation matrix consisting of the multiple subchannel estimated coefficients and the generator matrix, a real channel matrix can be determined, and in order to obtain the real channel matrix, an inverse transformation needs to be performed on the generator matrix. The vectorized data of the estimation matrix may be determined in a manner of arranging all rows or columns into column vectors.

Figure 5:
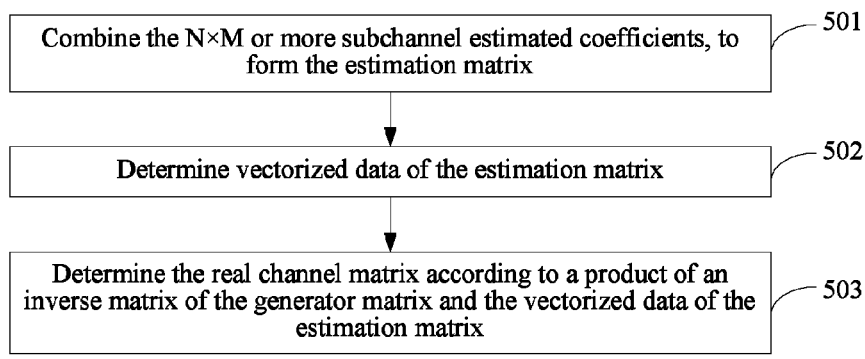
FIG. 5 is a flowchart of determining a real channel matrix according to an embodiment of the present invention.

For a specific process of step 203, reference may be made to FIG. 5. FIG. 5 is a flowchart of determining a real channel matrix according to an embodiment of the present invention. As shown in FIG. 5, step 203 may include the following steps:

Step 501: Combine the N×M or more subchannel estimated coefficients, to form the estimation matrix.

Step 502: Determine vectorized data of the estimation matrix.

Step 503: Determine the real channel matrix according to a product of an inverse matrix of the generator matrix and the vectorized data of the estimation matrix.

Content of obtaining the generator matrix according to the array size has already been introduced above. The generator matrix is a full-rank matrix, and each column of the generator matrix can constitute an N×M matrix whose rank is 1.

In another case, that is, in a case in which the quantity N of the array elements at the transmit end and the quantity M of the array elements at the receive end are both even numbers and the generator matrix is a Hadamard matrix, specific content of step 503 in the foregoing may be: determining the real channel matrix according to a product of a transpose matrix of the generator matrix and the vectorized data of the estimation matrix.

For ease of understanding, processes of performing the subchannel estimation procedure and finally obtaining the real channel matrix are specifically introduced in the following.

When a transmit end vector is configured to $w_t$ and a receive end vector is configured to $w_r$, in this case, an estimated coefficient h obtained by means of estimation by using the existing method may be expressed as:

$$h = w_r \cdot H \cdot w_t \qquad (1).$$

It can be obtained, by performing a matrix transformation on Formula (1), that:

$$h = (w_r \otimes w_t) \cdot vec\{H\} = w \cdot vec\{H\} \qquad (2),$$

where $w = (w_r \otimes w_t)$ represents a tensor product of two vectors, and $vec\{H\}$ represents vectorization of the real channel matrix H. As can be seen from Formula (2), when channel estimation is performed in a case in which the vectors $w_t$ and $w_r$ are configured, an estimated coefficient after weighted stacking of the real channel matrix is obtained.

In order to obtain a real channel by means of estimation, channel estimation needs to be performed N×M times in total. Assuming that a vector obtained by means of configuration during $i^{th}$ channel estimation is $w_i$ and $H_E$ is vectorized data of an estimation matrix consisting of multiple subchannel estimated coefficients, a final estimation result is:

$$vec\{H_E\} = [w_1, w_2, \ldots w_i, \ldots, w_{N \times M}].$$
$$vec\{H\} = W \cdot vec\{H\} \qquad (3).$$

Therefore, phase shifter vectors for different phase-shift angles may be configured during the N×M times of channel estimation, and neither a switch nor a gain control circuit is used, and an estimation matrix $H_E$, which is obtained by transforming the generator matrix W, of the real channel matrix H is finally obtained. In order to obtain the real channel matrix, an inverse transformation needs to be performed on the transformed matrix, that is, $$vec\{H\} = W^{-1} \cdot vec\{H_E\} = W^{-1} \cdot W \cdot vec\{H\} \qquad (4).$$

As can be seen, by introducing a method for synthesizing a transmit vector and a receive vector, during channel estimation, on/off and gain control of a channel can be ignored totally, and a real channel matrix can be obtained by only performing a corresponding inverse transformation on a final estimation result.

In this embodiment, according to the channel estimation method, a first vector group corresponding to a transmit end and a second vector group corresponding to a receive end are first obtained according to a transmit-receive array size; then a subchannel estimation procedure is performed multiple times according to the transmit-receive array size, the first vector group, and the second vector group, to obtain multiple corresponding subchannel estimated coefficients; and finally, a real channel matrix is determined according to the first vector group, the second vector group, and an estimation matrix consisting of the multiple subchannel estimated coefficients. According to the method, by using a vector synthesis method, on/off and gain control of subchannels on a communications channel can be ignored, and estimation for the subchannels can be implemented without depending on on/off of the subchannels, so that in a corresponding communications system, an accurate channel matrix can be obtained by means of estimation without adding any extra circuit device, thereby avoiding a problem that channel link performance degrades or precision of a channel estimation result is low because a radio frequency switch or a variable gain amplifier is added in the communications system, lowering a system cost, and reducing a system volume.

Figure 6:
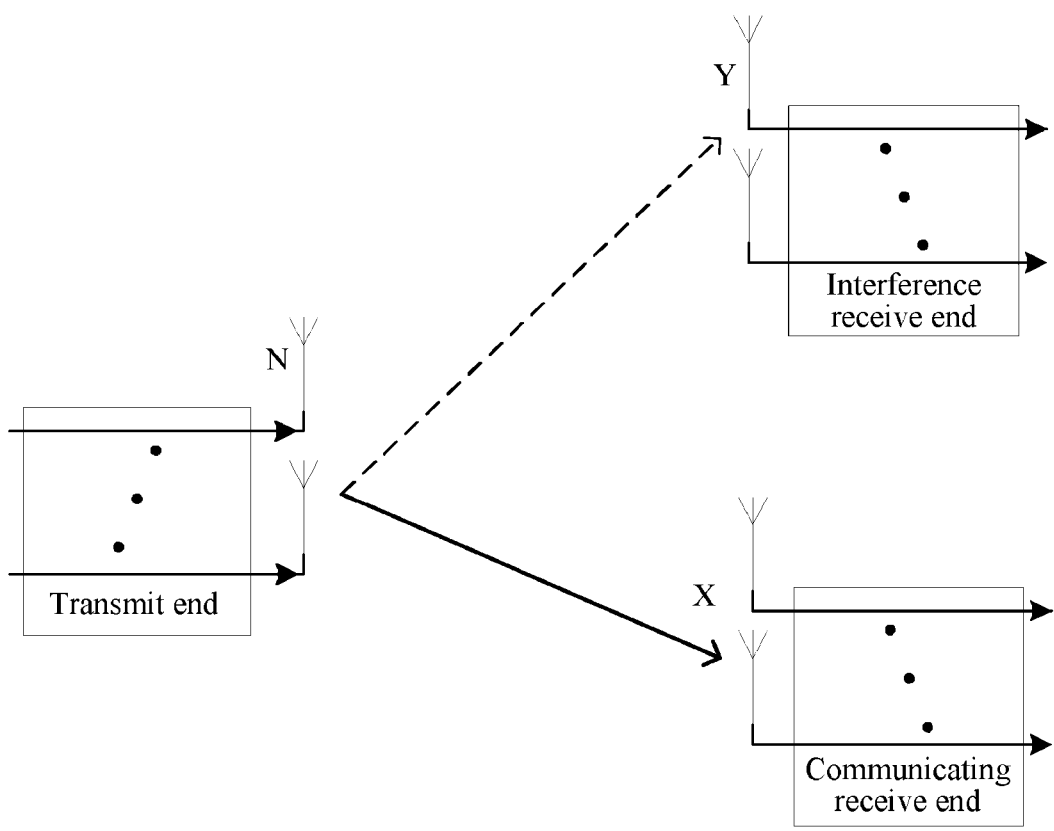
FIG. 6 is a structural diagram of a layout of a transmit end and a communicating receive end that are on a communications channel and an interference receive end.
Figure 7:
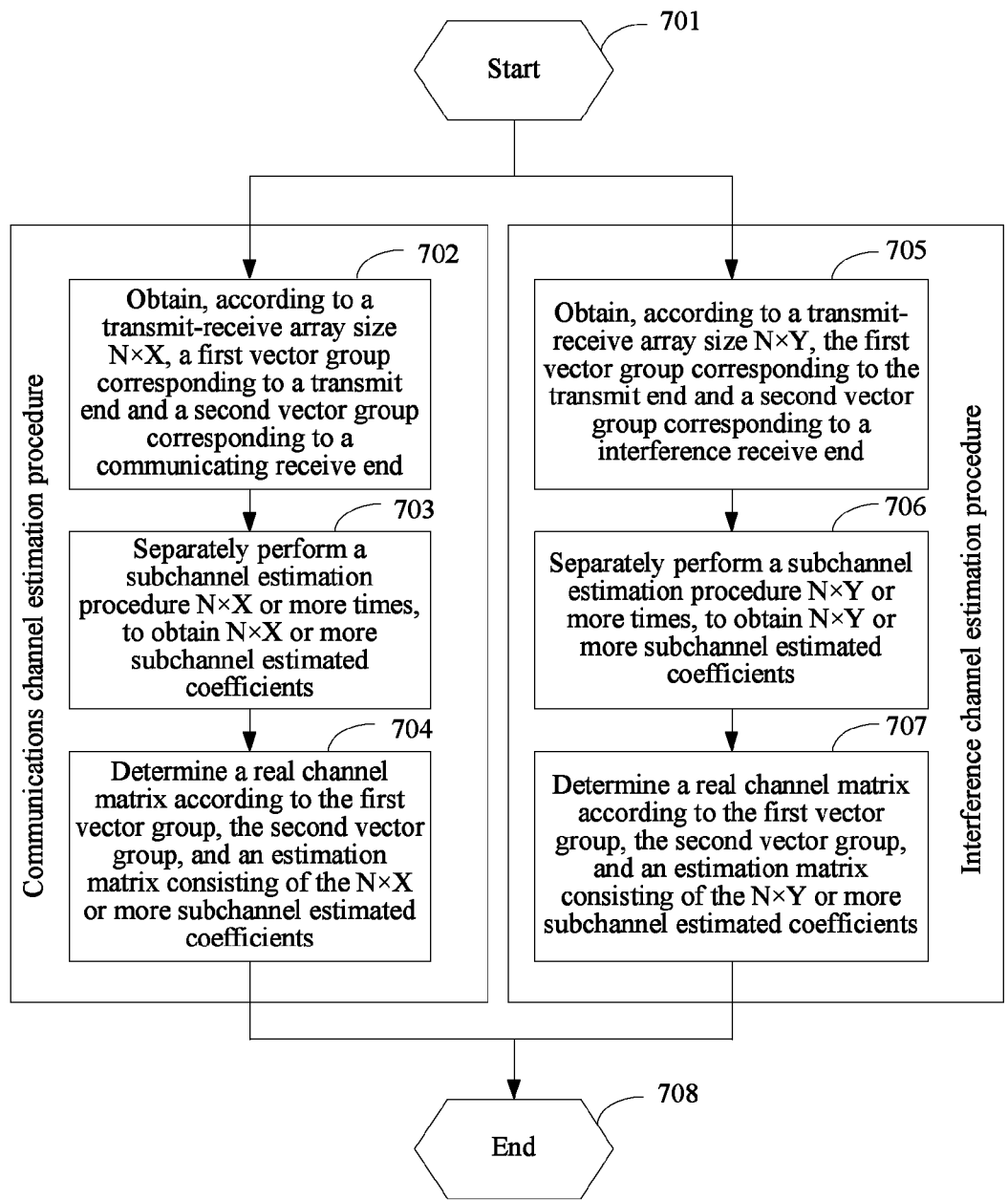
FIG. 7 is a flowchart of another channel estimation method according to an embodiment of the present invention.

FIG. 6 is a structural diagram of a layout of a transmit end and a communicating receive end that are on a communications channel and an interference receive end, and FIG. 7 is a flowchart of another channel estimation method according to an embodiment of the present invention. The method may be executed by a controller independent of the transmit end and the receive end. Certainly, the controller may be disposed at the transmit end, or may be disposed at the receive end, or may be disposed independently. Referring to FIG. 6 and FIG. 7, in the channel estimation method, communications channel estimation and interference channel estimation can be performed simultaneously. A quantity of array elements at the communicating receive end is X, and a quantity of array elements at the interference receive end is Y. The method may include the following steps:

Step 701: Start.

Steps 702 to 704 are a communications channel estimation procedure, and steps 705 to 707 are an interference channel estimation procedure. Step 703 and step 706 may be performed synchronously.

Step 702: Obtain, according to a transmit-receive array size N×X determined by a quantity N of array elements at the transmit end and the quantity X of the array elements at the communicating receive end, a first vector group corresponding to the transmit end and a second vector group corresponding to the communicating receive end, where N and X are positive integers.

Step 703: Separately perform a subchannel estimation procedure N×X or more times, to obtain N×X or more subchannel estimated coefficients.

Step 704: Determine a real channel matrix according to the first vector group, the second vector group, and an estimation matrix consisting of the N×X or more subchannel estimated coefficients.

Step 705: Obtain, according to a transmit-receive array size N×Y determined by the quantity N of the array elements at the transmit end and the quantity Y of the array elements at the interference receive end, the first vector group corresponding to the transmit end and a second vector group corresponding to the interference receive end, where N and Y are positive integers.

Step 706: Separately perform a subchannel estimation procedure N×Y or more times, to obtain N×Y or more subchannel estimated coefficients.

Step 707: Determine a real channel matrix according to the first vector group, the second vector group, and an estimation matrix consisting of the N×Y or more subchannel estimated coefficients.

Step 708: End.

In the foregoing embodiment, the channel estimation method has already been introduced in detail; and in this embodiment, for a detailed introduction of a related step, reference may be made to content of a related part in the foregoing embodiment.

In another embodiment, before step 703 and step 706 in the foregoing are performed synchronously, the method may further include a step of controlling the transmit end to synchronize with the communicating receive end and controlling the transmit end to synchronize with the interference receive end, to ensure that step 703 and step 706 in the foregoing can be performed synchronously and smoothly. Certainly, step 703 and step 706 in the foregoing may be performed synchronously, or may be not performed completely synchronously. When the quantity X of the array elements at the communicating receive end is the same as the quantity Y of array elements at the interference receive end, because a quantity of subchannels, for which estimation needs to be performed, of a communications channel is same as that of an interference channel, the two steps can be completely synchronous. When the quantity X of the array elements at the communicating receive end is different from the quantity Y of communications at the interference receive end, a quantity of subchannels, for which estimation needs to be performed, of one of the communications channel and the interference channel is larger; and a quantity of subchannels, for which estimation needs to be performed, of the other is smaller; therefore, estimation processes for some subchannels of the communications channel and the interference channel can be performed simultaneously.

Because a transmit end on the communications channel is same as a transmit end on the interference channel, but a receive end on the communications channel is different from a receive end on the interference channel, two cases may occur, that is, a quantity of array elements at the receive end on the communications channel may be the same as or different from a quantity of array elements at the receive end on the interference channel. In a case in which the quantities are the same, as mentioned above, a quantity of times that subchannel estimation needs to be performed for the communications channel is the same as a quantity of times that subchannel estimation needs to be performed for the interference channel; therefore, estimation for the communications channel and estimation for the interference channel can be performed synchronously. In a case in which the quantity of the array elements at the receive end on the communications channel is different from the quantity of the array elements at the receive end on the interference channel, there may be further two cases in which the quantity of the array elements at the receive end on the communications channel is less than or greater than the quantity of the array elements at the receive end on the interference channel.

When the size Y of the array elements at the interference receive end is less than the size X of the array elements at the communicating receive end, separately performing the subchannel estimation procedure multiple times to obtain multiple subchannel estimated coefficients in step 703 and step 706 may include: separately performing the subchannel estimation procedure N×X or more times for the communications channel, to obtain N×X or more subchannel estimated coefficients; separately performing the subchannel estimation procedure N×Y or more times for the interference channel, to obtain N×Y or more subchannel estimated coefficients; and after the subchannel estimation procedure has been performed for all subchannels of the interference channel, no longer performing the subchannel estimation procedure for the interference channel, and continuing to perform the subchannel estimation procedure for a not-yet-estimated subchannel of the communications channel.

When the size Y of the array elements at the interference channel receive end is greater than the size X of the array elements at the communicating receive end, separately performing the subchannel estimation procedure multiple times to obtain multiple subchannel estimated coefficients in step 703 and step 706 may include: separately performing the subchannel estimation procedure N×X or more times for the communications channel, to obtain N×X or more subchannel estimated coefficients; separately performing the subchannel estimation procedure N×Y or more times for the interference channel, to obtain N×Y or more subchannel estimated coefficients; and after the subchannel estimation procedure has been performed for all subchannels of the communications channel, no longer performing the subchannel estimation procedure for the communications channel, and continuing to perform the subchannel estimation procedure for a not-yet-estimated subchannel of the interference channel.

In another embodiment, before the subchannel estimation procedure is continued to be performed for the not-yet-estimated subchannel of the interference channel, the method may further include: controlling the interference receive end to send a remaining-subchannel estimation request to the transmit end, to continue subchannel estimation for a remaining subchannel.

In this embodiment, according to the channel estimation method, communications channel estimation and interference channel estimation can be performed simultaneously, thereby greatly improving channel estimation efficiency of a communications system. According to methods for communications channel estimation and interference channel estimation, a first vector group corresponding to a transmit end and a second vector group corresponding to a receive end may be first obtained according to a transmit-receive array size; then a subchannel estimation procedure is performed multiple times according to the transmit-receive array size, the first vector group, and the second vector group, to obtain multiple corresponding subchannel estimated coefficients; and finally, a real channel matrix is determined according to the first vector group, the second vector group, and an estimation matrix consisting of the multiple subchannel estimated coefficients. According to the channel estimation method, in a corresponding communications system, an accurate channel matrix can be obtained by means of estimation without adding any extra circuit device, thereby avoiding a problem that channel link performance degrades or precision of a channel estimation result is low because a radio frequency switch or a variable gain amplifier is added in the communications system, lowering a system cost, and reducing a system volume.

The method is described in detail in the foregoing disclosed embodiments of the present invention, and the method in the present invention can be implemented by using multiple forms of apparatuses. Therefore, the present invention further discloses an apparatus, which is described in detail in the following by providing specific embodiments.

Figure 8:
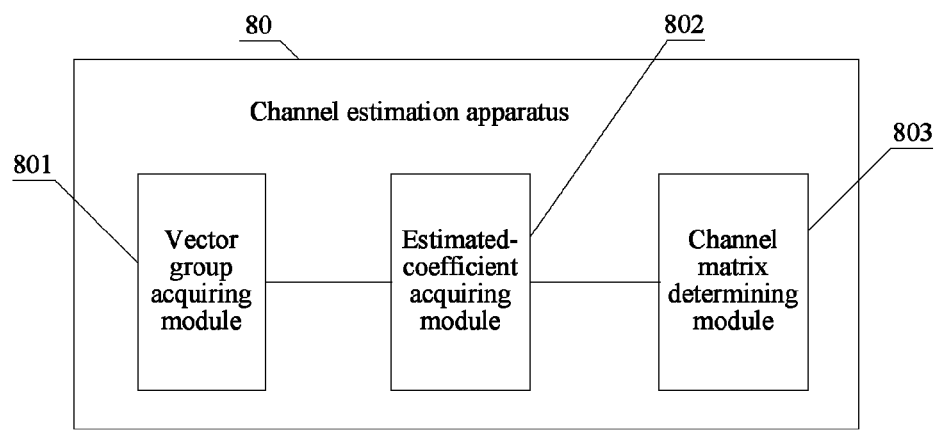
FIG. 8 is a schematic structural diagram of a channel estimation apparatus according to an embodiment of the present invention.

FIG. 8 is a schematic structural diagram of a channel estimation apparatus according to an embodiment of the present invention. The apparatus may be disposed in a controller independent of a transmit end and a receive end. The controller may be disposed at the transmit end, or may be disposed at the receive end, or may be disposed independently. Referring to FIG. 8, the channel estimation apparatus 80 may include: a vector group acquiring module 801, an estimated-coefficient acquiring module 802, and a channel matrix determining module 803.

The vector group acquiring module 801 is configured to obtain, according to a transmit-receive array size N×M determined by a quantity N of array elements at the transmit end and a quantity M of array elements at the receive end, a first vector group corresponding to the transmit end and a second vector group corresponding to the receive end, where N and M are positive integers.

Figure 9:
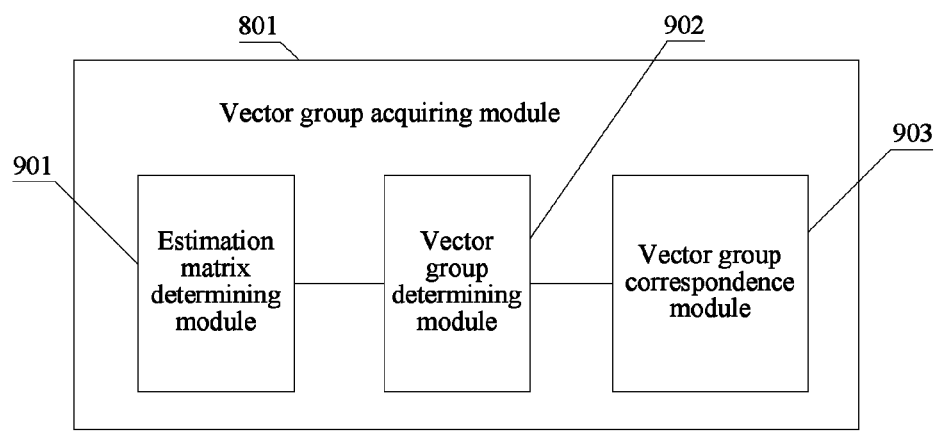
FIG. 9 is a schematic structural diagram of a vector group acquiring module according to an embodiment of the present invention.

For an exemplary specific structure of the vector group acquiring module 801, reference may be made to FIG. 9. FIG. 9 is a schematic structural diagram of a vector group acquiring module according to an embodiment of the present invention. As shown in FIG. 9, the vector group acquiring module 801 may include: an estimation matrix determining module 901, a vector group determining module 902, and a vector group correspondence module 903.

The estimation matrix determining module 901 is configured to generate an (N×M)×(N×M) matrix as a generator matrix according to the quantity N of the array elements at the transmit end and the quantity M of the array elements at the receive end, where the generator matrix is a full-rank matrix, and each column of the generator matrix can constitute an N×M matrix whose rank is 1.

The generator matrix is a full-rank matrix, and each column of the generator matrix can constitute an N×M matrix whose rank is 1. N and M are positive integers. When N and M are even numbers, the generator matrix may be a Hadamard matrix, and using of the Hadamard matrix can effectively simplify an operation in a channel estimation processing process and can simplify a channel estimation procedure on a system level.

The vector group determining module 902 is configured to perform tensor product decomposition on each column of the generator matrix according to the array size, to obtain the first vector group consisting of N×M vectors whose lengths are N and the second vector group consisting of N×M vectors whose lengths are M.

Because the generator matrix has N×M columns, tensor product decomposition needs to be performed N×M times in total. Each time tensor product decomposition is performed, one vector $w_t$ whose length is N and one vector $w_r$ whose length is M are obtained.

The vector group correspondence module 903 is configured to establish a correspondence between the first vector group and a transmit end array having N array elements, and establish a correspondence between the second vector group and a receive end array having M array elements.

In a subsequent processing process, the transmit end and the receive end can conveniently select vectors from respective corresponding vector groups and further enable the selected vectors to participate in work of phase shifter configuration.

In another example, the vector group acquiring module 801 may further include a vector merging module, where the vector merging module is configured to: after the vector group determining module 902 obtains the first vector group and the second vector group, merge same vectors in the first vector group, and merge same vectors in the second vector group. In this way, an amount of subsequent work of selecting vectors from the vector groups and configuring phase shifters can be reduced effectively.

The estimated-coefficient acquiring module 802 is configured to separately perform a subchannel estimation procedure N×M or more times, to obtain N×M or more subchannel estimated coefficients.

The subchannel may be considered as a single channel, and in the prior art, there are multiple methods that can implement acquiring of an estimated coefficient for a single channel.

The subchannel estimation procedure includes: selecting a first vector from the first vector group, selecting a second vector from the second vector group, and performing subchannel estimated coefficient detection on a subchannel determined by the first vector and the second vector, to obtain a subchannel estimated coefficient.

The estimated-coefficient acquiring module 802 may include a subchannel estimation module, where the subchannel estimation module is configured to perform a subchannel estimation procedure, where the subchannel estimation procedure may specifically include: selecting a transmit end vector from the first vector group corresponding to the transmit end, and configuring a phase shifter parameter of the transmit end; selecting a receive end vector from the second vector group corresponding to the receive end, and configuring a phase shifter parameter of the receive end; and controlling the transmit end to transfer a known training sequence signal to the receive end, and determining a subchannel estimated coefficient in current configuration according to signal quality of the known training sequence signal received by the receive end.

For a channel whose array size is N×M, subchannel estimation needs to be performed N×M times. Therefore, during the N×M times of subchannel estimation, phase shifter parameters for different phase-shift angles may be configured by using any combination of different vectors of the transmit end and the receive end.

Because a signal transferred from the transmit end to the receive end is a known training sequence signal, after the receive end receives the known training sequence signal, an estimated coefficient of a subchannel determined by current phase shifter configuration may be estimated according to signal quality of the received signal.

For a process of estimating, according to the signal quality of the signal received by the receive end, the estimated coefficient of the subchannel determined by the current phase shifter configuration, reference may be made to the following: Generally, a training sequence signal used for channel estimation is a special signal C consisting of several complex number symbols. The special signal C has two features: one is that a result of a related operation performed on C and a conjugate signal of C is a constant a, where the constant a is a real number; and the other is that a result of the foregoing related operation performed on a signal D and a conjugate signal of the special signal C that is before the shift is 0, where the signal D is obtained after any cyclic shift is performed on the special signal C. In this embodiment, during channel estimation, a signal R received by the receive end may be considered as a convolution of the signal C sent by the transmit end and a channel coefficient h. Channel estimation is performing a related operation on the received signal R and the conjugate signal of the sent signal C by using the foregoing two features of the training sequence signal, where the related operation includes that: each symbol of R is multiplied by each symbol of the conjugate signal of C, and products are added together, where an obtained result is a*h; and then a*h is divided by the constant a, where a complex number value that is finally obtained is the channel coefficient h, that is, a channel estimated coefficient in this embodiment.

The channel matrix determining module 803 is configured to determine a real channel matrix according to the first vector group, the second vector group, and an estimation matrix consisting of the N×M or more subchannel estimated coefficients.

Figure 10:
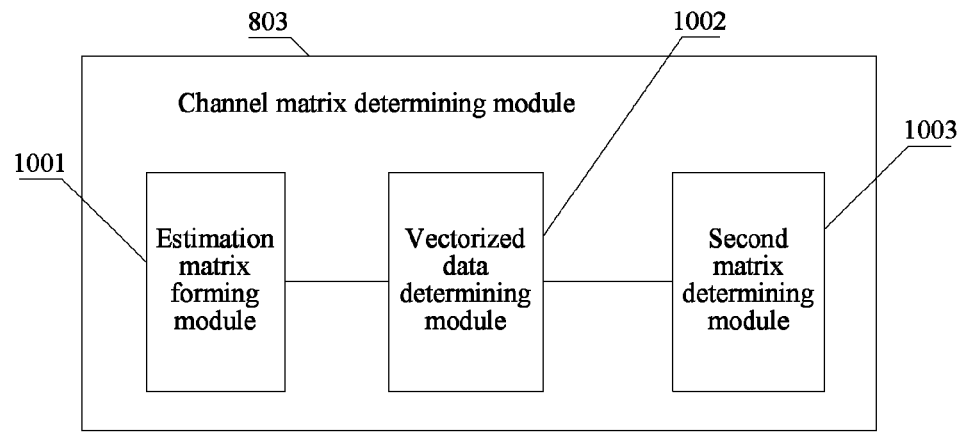
FIG. 10 is a schematic structural diagram of a channel matrix determining module according to an embodiment of the present invention.

In an exemplary example, for a specific structure of the channel matrix determining module 803, reference may be made to FIG. 10. FIG. 10 is a schematic structural diagram of a channel matrix determining module according to an embodiment of the present invention. As shown in FIG. 10, the channel matrix determining module 803 may include:

an estimation matrix forming module 1001, configured to combine the N×M or more subchannel estimated coefficients, to form the estimation matrix;

a vectorized data determining module 1002, configured to determine vectorized data of the estimation matrix; and a second matrix determining module 1003, configured to determine the real channel matrix according to a product of an inverse matrix of the generator matrix and the vectorized data of the estimation matrix.

Content of obtaining the generator matrix according to the array size has already been introduced above. The generator matrix is a full-rank matrix, and each column of the generator matrix can constitute an N×M matrix whose rank is 1.

In a case in which the estimation matrix is a Hadamard matrix, in a different embodiment, the second matrix module 1003 may be a first matrix module, configured to determine the real channel matrix according to a product of a transpose matrix of the generator matrix and the vectorized data of the estimation matrix.

In this embodiment, the channel estimation apparatus can first obtain, according to a transmit-receive array size, a first vector group corresponding to a transmit end and a second vector group corresponding to a receive end; then perform a subchannel estimation procedure multiple times according to the transmit-receive array size, the first vector group, and the second vector group, to obtain multiple corresponding subchannel estimated coefficients; and finally determine a real channel matrix according to the first vector group, the second vector group, and an estimation matrix consisting of the multiple subchannel estimated coefficients. According to the apparatus, by using a vector synthesis method, on/off and gain control of subchannels on a communications channel can be ignored, and estimation for the subchannels can be implemented without depending on on/off of the subchannels, so that in a corresponding communications system, an accurate channel matrix can be obtained by means of estimation without adding any extra circuit device, thereby avoiding a problem that channel link performance degrades or precision of a channel estimation result is low because a radio frequency switch or a variable gain amplifier is added in the communications system, lowering a system cost, and reducing a system volume.

Figure 11:
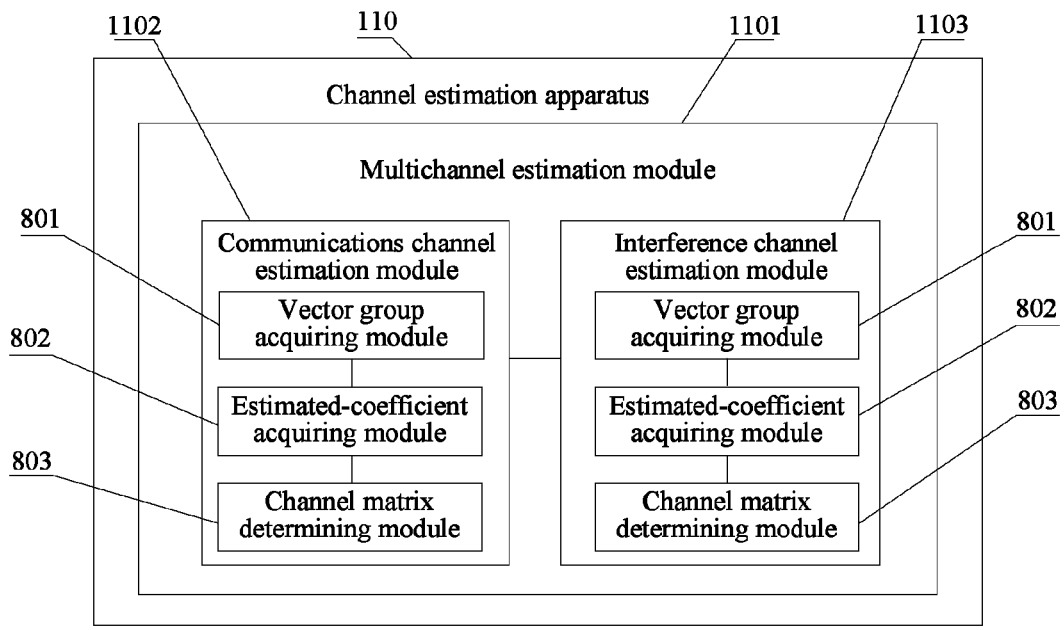
FIG. 11 is a schematic structural diagram of another channel estimation apparatus according to an embodiment of the present invention.

FIG. 11 is a schematic structural diagram of another channel estimation apparatus according to an embodiment of the present invention. The apparatus may be disposed in a controller independent of a transmit end and a receive end. The controller may be disposed at the transmit end, or may be disposed at the receive end, or may be disposed independently. The receive end includes a communicating receive end and an interference receive end, where a quantity of array elements at the communicating receive end is X, and a quantity of array elements at the interference receive end is Y. Referring to FIG. 11, the channel estimation apparatus 110 may include:

a multichannel estimation module 1101, configured to perform communications channel estimation and interference channel estimation simultaneously, where the multichannel estimation module 1101 includes a communications channel estimation module 1102 and an interference channel estimation module 1103, where both the communications channel estimation module and the interference channel estimation module include:

a vector group acquiring module 801, configured to obtain, according to a transmit-receive array size, a first vector group corresponding to the transmit end and a second vector group corresponding to the receive end;

an estimated-coefficient acquiring module 802, configured to perform a subchannel estimation procedure multiple times according to the transmit-receive array size, the first vector group, and the second vector group, to obtain multiple corresponding subchannel estimated coefficients, which may be specifically: separately performing the subchannel estimation procedure N×X or more times for a communications channel, to obtain N×X or more subchannel estimated coefficients, and separately performing the subchannel estimation procedure N×Y or more times for an interference channel, to obtain N×Y or more subchannel estimated coefficients; and a channel matrix determining module 803, configured to determine a real channel matrix according to the first vector group, the second vector group, and an estimation matrix consisting of the multiple subchannel estimated coefficients obtained by the estimated-coefficient acquiring module.

In another embodiment, the channel estimation apparatus may further include a synchronization control module, configured to: before the estimated-coefficient acquiring module 802 performs the subchannel estimation procedure multiple times according to the transmit-receive array size, the first vector group, and the second vector group, control the transmit end to synchronize with the communicating receive end, and control the transmit end to synchronize with the interference receive end.

In this embodiment, the channel estimation apparatus can perform communications channel estimation and interference channel estimation simultaneously, thereby greatly improving channel estimation efficiency of a communications system. According to methods for communications channel estimation and interference channel estimation, a first vector group corresponding to a transmit end and a second vector group corresponding to a receive end may be first obtained according to a transmit-receive array size; then a subchannel estimation procedure is performed multiple times according to the transmit-receive array size, the first vector group, and the second vector group, to obtain multiple corresponding subchannel estimated coefficients; and finally, a real channel matrix is determined according to the first vector group, the second vector group, and an estimation matrix consisting of the multiple subchannel estimated coefficients. According to the channel estimation apparatus, in a corresponding communications system, an accurate channel matrix can be obtained by means of estimation without adding any extra circuit device, thereby avoiding a problem that channel link performance degrades or precision of a channel estimation result is low because a radio frequency switch or a variable gain amplifier is added in the communications system, lowering a system cost, and reducing a system volume Further, the present invention further discloses a communications system, where the communications system includes the channel estimation apparatus disclosed in any one of the foregoing embodiments. Because the communications system includes the channel estimation apparatus disclosed in any one of the foregoing embodiments, the communications system can also first obtain, according to a transmit-receive array size, a first vector group corresponding to a transmit end and a second vector group corresponding to a receive end; then perform a subchannel estimation procedure multiple times according to the transmit-receive array size, the first vector group, and the second vector group, to obtain multiple corresponding subchannel estimated coefficients; and finally determine a real channel matrix according to the first vector group, the second vector group, and an estimation matrix consisting of the multiple subchannel estimated coefficients. According to the apparatus, by using a vector synthesis method, on/off and gain control of subchannels on a communications channel can be ignored, and estimation for the subchannels can be implemented without depending on on/off of the subchannels, so that in a corresponding communications system, an accurate channel matrix can be obtained by means of estimation without adding any extra circuit device, thereby avoiding a problem that channel link performance degrades or precision of a channel estimation result is low because a radio frequency switch or a variable gain amplifier is added in the communications system, lowering a system cost, and reducing a system volume.

Figure 12:
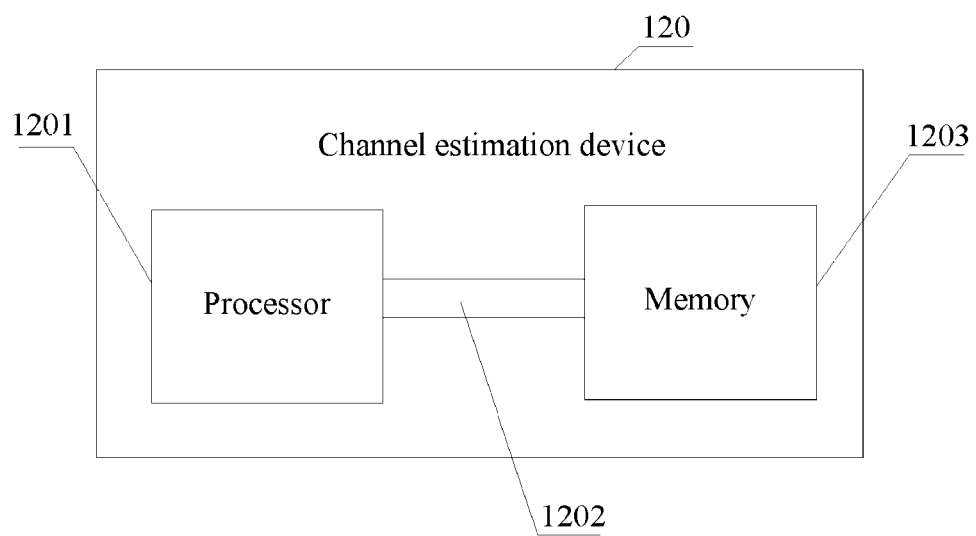
FIG. 12 is a schematic structural diagram of a channel estimation device according to an embodiment of the present invention.

As can be known from the foregoing description, a person skilled in the art may clearly understand that this application can be implemented in a manner of software and a necessary universal hardware platform. Therefore, an embodiment of this application further provides a channel estimation device, and reference may be made to FIG. 12. FIG. 12 is a schematic structural diagram of a channel estimation device according to an embodiment of the present invention. The channel estimation device 120 includes at least a processor 1201, a communications bus 1202, and a memory 1203, where the processor 1201 and the memory 1203 communicate with each other by using the communications bus 1202;

the memory 1203 is configured to store a group of program instructions, where the memory 1203 may be a high speed RAM memory, or may be a non-volatile memory (non-volatile memory), for example, at least one magnetic disk memory; and the processor 1201 is configured to invoke the program instructions stored in the memory, to execute the following operations:

obtaining, according to a transmit-receive array size N×M determined by a quantity N of array elements at a transmit end and a quantity M of array elements at a receive end, a first vector group corresponding to the transmit end and a second vector group corresponding to the receive end, where N and M are positive integers;

separately performing a subchannel estimation procedure N×M or more times, to obtain N×M or more subchannel estimated coefficients, where the subchannel estimation procedure includes: selecting a first vector from the first vector group, selecting a second vector from the second vector group, and performing subchannel estimated coefficient detection on a subchannel determined by the first vector and the second vector, to obtain a subchannel estimated coefficient; and determining a real channel matrix according to the first vector group, the second vector group, and an estimation matrix consisting of the N×M or more subchannel estimated coefficients.

The processor 1201 may be a central processing unit CPU, or may be an application-specific integrated circuit ASIC (Application Specific Integrated Circuit), or may be configured as one or more integrated circuits that implement the embodiments of the present invention.

The embodiments in this specification are all described in a progressive manner. A description of each of the embodiments focuses on a difference from other embodiments, and reference may be made to each other for the same or similar parts among the embodiments. The apparatus disclosed in the embodiments corresponds to the method disclosed in the embodiments and therefore is briefly described, and reference may be made to a description of the method part for a related part.

It should be further noted that the relational terms herein such as first and second are used only to differentiate an entity or operation from another entity or operation, and do not require or imply any actual relationship or sequence between these entities or operations. Moreover, the terms "include", "contain", and any variants thereof are intended to cover a non-exclusive inclusion. Therefore, a process, method, object, or device that includes a series of elements not only includes such elements, but also includes other elements not specified expressly, or may include inherent elements of the process, method, object, or device. Unless otherwise specified, an element limited by "include a/an . . . " does not exclude other same elements existing in the process, the method, the object, or the device that includes the element.

In combination with the embodiments disclosed in this specification, the described method or algorithm steps may be directly implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

The foregoing descriptions of the disclosed embodiments enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention is not limited to the embodiments described in this specification but extends to the widest scope that complies with the principles and novelties disclosed in this specification.

What is claimed is:

1. A channel estimation method, comprising:

obtaining, according to a transmit-receive array size N×M determined by a quantity N of array elements at a transmit end and a quantity M of array elements at a receive end, a first vector group corresponding to the transmit end and a second vector group corresponding to the receive end, wherein N and M are positive integers;

separately performing a subchannel estimation procedure N×M or more times, to obtain N×M or more subchannel estimated coefficients, wherein the subchannel estimation procedure comprises: selecting a first vector from the first vector group, selecting a second vector from the second vector group, and performing subchannel estimated coefficient detection on a subchannel determined by the first vector and the second vector, to obtain a subchannel estimated coefficient; and determining a real channel matrix according to the first vector group, the second vector group, and an estimation matrix comprising the N×M or more subchannel estimated coefficients, wherein the receive end comprises a communicating receive end and an interference receive end, and before the separately performing a subchannel estimation procedure N×M or more times, the method further comprises controlling the transmit end to synchronize with the communicating receive end, and controlling the transmit end to synchronize with the interference receive end, wherein a quantity of array elements at the communicating receive end is X, and a quantity of array elements at the interference receive end is Y, and wherein when the quantity Y of the array elements at the interference receive end is less than the quantity X of the array elements at the communicating receive end, the separately performing a subchannel estimation procedure N×M or more times comprises:

separately performing the subchannel estimation procedure N×X or more times for the communications channel, to obtain N×X or more subchannel estimated coefficients; separately performing the subchannel estimation procedure N×Y or more times for an interference channel, to obtain N×Y or more subchannel estimated coefficients; and after the subchannel estimation procedure has been performed for all subchannels of the interference channel, no longer performing the subchannel estimation procedure for the interference channel, and continuing to perform the subchannel estimation procedure for a not-yet-estimated subchannel of the communications channel, and when the quantity Y of the array elements at the interference receive end is greater than the quantity X of the array elements at the communicating receive end, the separately performing a subchannel estimation procedure N×M or more times comprises:

separately performing a subchannel estimation procedure N×X or more times for a communications channel, to obtain N×X or more subchannel estimated coefficients; separately performing a subchannel estimation procedure N×Y or more times for the interference channel, to obtain N×Y or more subchannel estimated coefficients; and after the subchannel estimation procedure has been performed for all subchannels of the communications channel, no longer performing the subchannel estimation procedure for the communications channel, and continuing to perform the subchannel estimation procedure for a not-yet-estimated subchannel of the interference channel.

2. The channel estimation method according to claim 1, wherein the obtaining, according to a transmit-receive array size, a first vector group corresponding to the transmit end and a second vector group corresponding to the receive end comprises:

generating an (N×M)×(N×M) matrix as a generator matrix according to the quantity N of the array elements at the transmit end and the quantity M of the array elements at the receive end, wherein the generator matrix is a full-rank matrix, and each column of the generator matrix can constitute an N×M matrix whose rank is 1;

performing tensor product decomposition on each column of the generator matrix according to the array size, to obtain the first vector group consisting of N×M vectors whose lengths are N and the second vector group consisting of N×M vectors whose lengths are M; and establishing a correspondence between the first vector group and a transmit end array having N array elements, and establishing a correspondence between the second vector group and a receive end array having M array elements.

3. The channel estimation method according to claim 2, wherein after the obtaining a first vector group and a second vector group, the method further comprises:

merging same vectors in the first vector group, and merging same vectors in the second vector group.

4. The channel estimation method according to claim 2, wherein when N and M are even numbers, the generator matrix is a Hadamard matrix, and the determining a real channel matrix according to the first vector group, the second vector group, and an estimation matrix consisting of the N×M or more subchannel estimated coefficients comprises:

combining the N×M or more subchannel estimated coefficients, to form the estimation matrix;
determining vectorized data of the estimation matrix; and
determining the real channel matrix according to a product of a transpose matrix of the generator matrix and the vectorized data of the estimation matrix.

5. The channel estimation method according to claim 2, wherein the determining a real channel matrix according to the first vector group, the second vector group, and an estimation matrix consisting of the N×M or more subchannel estimated coefficients comprises:

combining the N×M or more subchannel estimated coefficients, to form the estimation matrix;
determining vectorized data of the estimation matrix; and
determining the real channel matrix according to a product of an inverse matrix of the generator matrix and the vectorized data of the estimation matrix.

6. The channel estimation method according to claim 1, wherein the selecting a first vector from the first vector group, selecting a second vector from the second vector group, and performing subchannel estimated coefficient detection on a subchannel determined by the first vector and the second vector, to obtain a subchannel estimated coefficient comprises:

selecting the first vector from the first vector group corresponding to the transmit end, and configuring a phase shifter parameter of the transmit end; and selecting the second vector from the second vector group corresponding to the receive end, and configuring a phase shifter parameter of the receive end; and controlling the transmit end to transfer a known training sequence signal to the receive end, and determining the subchannel estimated coefficient in current configuration according to signal quality of the known training sequence signal received by the receive end.

7. The channel estimation method according to claim 1, wherein the separately performing a subchannel estimation procedure N×M or more times, to obtain N×M or more subchannel estimated coefficients comprises:

sequentially pairing each vector in the first vector group corresponding to the transmit end with each vector in the second vector group corresponding to the receive end, configuring phase shifter parameters by using results of the pairing separately, and transmitting the known signal, to obtain multiple subchannel estimated coefficients that each correspond to each vector pairing case.

8. The channel estimation method according to claim 1, wherein before the continuing to perform the subchannel estimation procedure for the not-yet-estimated subchannel of the interference channel, the method further comprises:

controlling the interference receive end to send a remaining-subchannel estimation request to the transmit end.

9. A channel estimation apparatus, comprising:
at least one memory configured to store at least one instruction; and
at least one hardware processor
configured to:
obtain, according to a transmit-receive array size N×M determined by a quantity N of array elements at a transmit end and a quantity M of array elements at a receive end, a first vector group corresponding to the transmit end and a second vector group corresponding to the receive end, wherein N and M are positive integers;
separately perform a subchannel estimation procedure N×M or more times, to obtain N×M or more subchannel estimated coefficients, wherein the subchannel estimation procedure comprises: selecting a first vector from the first vector group, selecting a second vector from the second vector group, and performing subchannel estimated coefficient detection on a subchannel determined by the first vector and the second vector, to obtain a subchannel estimated coefficient; and
determine a real channel matrix according to the first vector group, the second vector group, and an estimation matrix consisting of the N×M or more subchannel estimated coefficients,
wherein the receive end comprises a communicating receive end and an interference receive end, and before the separately performing a subchannel estimation procedure N×M or more times, the at least one hardware processor is further configured to control the transmit end to synchronize with the communicating receive end, and control the transmit end to synchronize with the interference receive end,
wherein a quantity of array elements at the communicating receive end is X, and a quantity of array elements at the interference receive end is Y, and
wherein when the quantity Y of the array elements at the interference receive end is less than the quantity X of the array elements at the communicating receive end, the separately performing a subchannel estimation procedure N×M or more times comprises:

separately performing a subchannel estimation procedure N×X or more times for a communications channel, to obtain N×X or more subchannel estimated coefficients; separately performing a subchannel estimation procedure N×Y or more times for an interference channel, to obtain N×Y or more subchannel estimated coefficients; and after the subchannel estimation procedure has been performed for all subchannels of the interference channel, no longer performing the subchannel estimation procedure for the interference channel, and continuing to perform the subchannel estimation procedure for a not-yet-estimated subchannel of the communications channel, and when the quantity Y of the array elements at the interference receive end is greater than the quantity X of the array elements at the communicating receive end, the separately performing a subchannel estimation procedure N×M or more times comprises:

separately performing the subchannel estimation procedure N×X or more times for the communications channel, to obtain N×X or more subchannel estimated coefficients; separately performing the subchannel estimation procedure N×Y or more times for the interference channel, to obtain N×Y or more subchannel estimated coefficients; and after the subchannel estimation procedure has been performed for all subchannels of the communications channel, no longer performing the subchannel estimation procedure for the communications channel, and continuing to perform the subchannel estimation procedure for a not-yet-estimated subchannel of the interference channel.

10. The channel estimation apparatus according to claim 9, wherein the at least one hardware processor is further configured to:

generate an (N×M)×(N×M) matrix as a generator matrix according to the quantity N of the array elements at the transmit end and the quantity M of the array elements at the receive end, wherein the generator matrix is a full-rank matrix, and each column of the generator matrix can constitute an N×M matrix whose rank is 1;

perform tensor product decomposition on each column of the generator matrix according to the array size, to obtain the first vector group consisting of N×M vectors whose lengths are N and the second vector group consisting of N×M vectors whose lengths are M; and establish a correspondence between the first vector group and a transmit end array having N array elements, and establish a correspondence between the second vector group and a receive end array having M array elements.

11. The channel estimation apparatus according to claim 10, wherein the
at least one hardware processor is further configured to:
after the at least one hardware processor obtains the first vector group and the second vector group, merge same vectors in the first vector group, and merge same vectors in the second vector group.

12. The channel estimation apparatus according to claim 10, wherein when N and M are even numbers, the generator matrix is a Hadamard matrix, and the
at least one hardware processor is further configured to:
combine the N×M or more subchannel estimated coefficients, to form the estimation matrix;
determine vectorized data of the estimation matrix; and
determine the real channel matrix according to a product of a transpose matrix of the generator matrix and the vectorized data of the estimation matrix.

13. The channel estimation apparatus according to claim 9, wherein the
at least one hardware processor is further configured to:
combine the N×M or more subchannel estimated coefficients, to form the estimation matrix;

determine vectorized data of the estimation matrix; and
determine the real channel matrix according to a product of an inverse matrix of the generator matrix and the vectorized data of the estimation matrix.

14. The channel estimation apparatus according to claim 9, wherein the at least one hardware processor is further configured to perform a subchannel estimation procedure, wherein the subchannel estimation procedure comprises:
   selecting the first vector from the first vector group corresponding to the transmit end, and configuring a phase shifter parameter of the transmit end; and selecting the second vector from the second vector group corresponding to the receive end, and configuring a phase shifter parameter of the receive end; and
   controlling the transmit end to transfer a known training sequence signal to the receive end, and determining the subchannel estimated coefficient in current configuration according to signal quality of the known training sequence signal received by the receive end.

15. A channel estimation device, comprising: a processor, a communications bus, and a memory, wherein the processor and the memory communicate with each other by using the communications bus;
   the memory is configured to store a group of program instructions; and
   the processor is configured to invoke the program instructions stored in the memory, to execute the following operations:
      obtaining, according to a transmit-receive array size N×M determined by a quantity N of array elements at a transmit end and a quantity M of array elements at a receive end, a first vector group corresponding to the transmit end and a second vector group corresponding to the receive end, wherein N and M are positive integers;
      separately performing a subchannel estimation procedure N×M or more times, to obtain N×M or more subchannel estimated coefficients, wherein the subchannel estimation procedure comprises: selecting a first vector from the first vector group, selecting a second vector from the second vector group, and performing subchannel estimated coefficient detection on a subchannel determined by the first vector and the second vector, to obtain a subchannel estimated coefficient; and
      determining a real channel matrix according to the first vector group, the second vector group, and an estimation matrix consisting of the N×M or more subchannel estimated coefficients,
   wherein the receive end comprises a communicating receive end and an interference receive end, and before the separately performing a subchannel estimation procedure N×M or more times, the method further comprises controlling the transmit end to synchronize with the communicating receive end, and controlling the transmit end to synchronize with the interference receive end,
   wherein a quantity of array elements at the communicating receive end is X, and a quantity of array elements at the interference receive end is Y, and
   wherein when the quantity Y of the array elements at the interference receive end is less than the quantity X of the array elements at the communicating receive end, the separately performing a subchannel estimation procedure N×M or more times comprises:
      separately performing a subchannel estimation procedure N×X or more times for a communications channel, to obtain N×X or more subchannel estimated coefficients; separately performing a subchannel estimation procedure N×Y or more times for an interference channel, to obtain N×Y or more subchannel estimated coefficients; and after the subchannel estimation procedure has been performed for all subchannels of the interference channel, no longer performing the subchannel estimation procedure for the interference channel, and continuing to perform the subchannel estimation procedure for a not-yet-estimated subchannel of the communications channel, and
   when the quantity Y of the array elements at the interference receive end is greater than the quantity X of the array elements at the communicating receive end, the separately performing a subchannel estimation procedure N×M or more times comprises:
   separately performing the subchannel estimation procedure N×X or more times for the communications channel, to obtain N×X or more subchannel estimated coefficients; separately performing the subchannel estimation procedure N×Y or more times for the interference channel, to obtain N×Y or more subchannel estimated coefficients; and after the subchannel estimation procedure has been performed for all subchannels of the communications channel, no longer performing the subchannel estimation procedure for the communications channel, and continuing to perform the subchannel estimation procedure for a not-yet-estimated subchannel of the interference channel.

* * * * *